UNITED STATES PATENT OFFICE.

HENRY KNIGHT, OF LIVERPOOL, ENGLAND, ASSIGNOR TO THOMAS GRIFFITHS, OF SAME PLACE.

MANUFACTURE OF WHITE PIGMENTS.

SPECIFICATION forming part of Reissued Letters Patent No. 9,481, dated November 30, 1880.

Original No. 212,017, dated February 4, 1879. Application for reissue filed September 28, 1880.

*To all whom it may concern:*

Be it known that I, HENRY KNIGHT, of Liverpool, in the county of Lancaster, England, have invented an Improvement in the Manufacture of Pigments, of which the following is a specification.

My invention consists of a new method or process of manufacturing pigment, and of the resulting mixture or compound, all of which will be fully understood by the following description.

I take the native sulphate of baryta and mix the same with the sulphide of zinc, in the proportion of about sixty-two parts of sulphate of baryta to twenty-one parts of sulphide of zinc, and grind the mixture in water to an impalpable power. To this mixture I add, say, seventeen parts of carbonate of magnesia, and calcine the whole at a dull-red heat, excluding the air by an air-tight chamber, or by the employment of nitrogen or other non-oxidizing gas in lieu of atmospheric air, as is well understood by chemists. This calcined mixture, while at red heat, is plunged into water, and afterward dried and triturated, thus forming my improved pigment, which consists of a mixture of sulphate of baryta, sulphide of zinc, and oxide of magnesium.

Having described my invention, I claim—

1. The above-described method or process of calcining materials containing sulphide of zinc, consisting in calcining them to a red heat out of contact of air or free oxygen, so as to allow the sulphide to remain unoxidized.

2. The above-described method or process, consisting of grinding a mixture of sulphate of baryta and sulphide of zinc, and then mixing the same with carbonate of magnesia, and calcining this mixture while air is excluded, in the manner described, and then plunging the hot mixture into water, and finally drying and triturating same, substantially as set forth.

3. The composition of matter herein described, the same being a white powder or pigment, consisting of sulphate of baryta with sulphide of zinc and oxide of magnesium.

HENRY KNIGHT.

Witnesses:
WM. P. THOMPSON,
JOHN O. O'BRIEN.